No. 835,420. PATENTED NOV. 6, 1906.
N. HEID.
METHOD OF MAKING TUBES.
APPLICATION FILED JAN. 6, 1906.
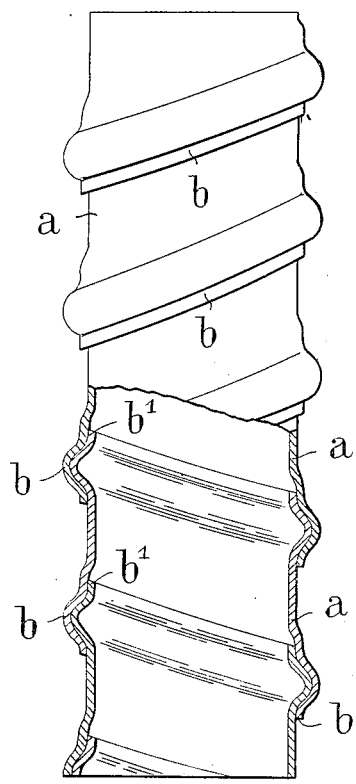
Witnesses:
Ernest E. Weaver.
C. D. Kesler
Inventor
Nicolaus Heid
By James L. Norris
Atty

UNITED STATES PATENT OFFICE.

NICOLAUS HEID, OF STOCKERAU, AUSTRIA-HUNGARY.

METHOD OF MAKING TUBES.

No. 835,420.　　　　Specification of Letters Patent.　　　　Patented Nov. 6, 1906.

Application filed January 6, 1906. Serial No. 294,865.

*To all whom it may concern:*

Be it known that I, NICOLAUS HEID, a subject of the Emperor of Germany, residing at Stockerau, in Lower Austria-Hungary, have invented certain new and useful Improvements in method of Making Tubes, of which the following is a specification.

In the known methods of making tubes from spirally-wound metallic strips it is absolutely necessary to solder the seams or overlapping edges of the tubes in order to make them perfectly tight and resisting to high internal pressure. This soldering was ordinarily effected in such a manner that the tube was removed from the winding-mandril and was immersed in a bath of molten soldering metal or by using for the production of the tubes either ordinary metallic strips or metallic strips coated with soldering metal, which strips are immersed in the soldering-bath during the winding operation, so that the winding and the soldering operations take place simultaneously. However, neither of the two methods of soldering is capable of producing a perfect or uniform intimate soldering of the overlapping surfaces of the edges of the strips or of the seams. In the case of the first-named method the liquid soldering metal will not penetrate between the surfaces of the strip edges, because these surfaces are lying too tightly one upon the other, so that the soldering will take place only at the ends of the edge surfaces and not on the whole surfaces. In the case of the second method, no matter whether ordinary metallic strips or strips connected with soldering metal have been employed, the liquid soldering metal will be squeezed out from between the adjacent surfaces of the strip edges in consequence of the high pressure employed during the winding operation, so that at the places of the seam there will remain too small quantities of solder for producing a good reliable soldering connection. Besides the solder squeezed out from between the strip edges is liable to solder the tube to the mandril, so that it will be impossible or difficult to remove the tube from the mandril. Finally, the heat which is required for the soldering operation has a prejudicial effect on the winding apparatus.

The accompanying drawing shows by way of example a tube made according to this method in side elevation and partly in section.

The improved process is essentially carried out as follows: The metallic strip $a$, coated with an easily-fusible metal either entirely or only on its edges in the breadth corresponding to the overlapping surfaces—for instance, a cold-rolled steel strip coated with tin, zinc, or lead—is wound up spirally into a tube while it is in a cold condition—that is to say, when the soldering metal is solidified—whereupon the tube removed from the mandril is immersed in a bath of molten soldering metal—such, as for instance, tin, zinc, lead, or alloys of these metals. In consequence of this immersion the tube becomes heated, and the edges $b$ $b'$, which form the connecting-surfaces of the spiral strip and may, if necessary, be provided with creases, are uniformly soldered and connected on their overlapping surfaces, so that the tube is in this most simple manner made perfectly tight. According to this method, tubes of very high resisting power can be produced at a comparatively low expense.

I claim—

1. A method consisting of coating a strip with solder, then forming the strip while in a cold condition into a spiral tubular form and finally immersing the tube into a molten mass to fuse the solder, for uniting the overlapped portions of the strip and for sealing externally the joint formed at such overlapped portions.

2. A method consisting of coating a strip with soldering material, forming said strip into a tube by spirally winding the same on itself with its edge portions overlapping and when cold and finally immersing the tube thus formed into a bath of soldering metal to unite said overlapped portions and to externally seal the joint between the same.

In testimony whereof I have hereunto set my hand in presence of two subscribing witnesses.

NICOLAUS HEID.

Witnesses:
　JOSEF RUBASCH,
　ALVESTO S. HOGUE.